No. 858,462. PATENTED JULY 2, 1907.
J. C. MacLACHLAN.
ELASTIC WHEEL.
APPLICATION FILED DEC. 7, 1906.
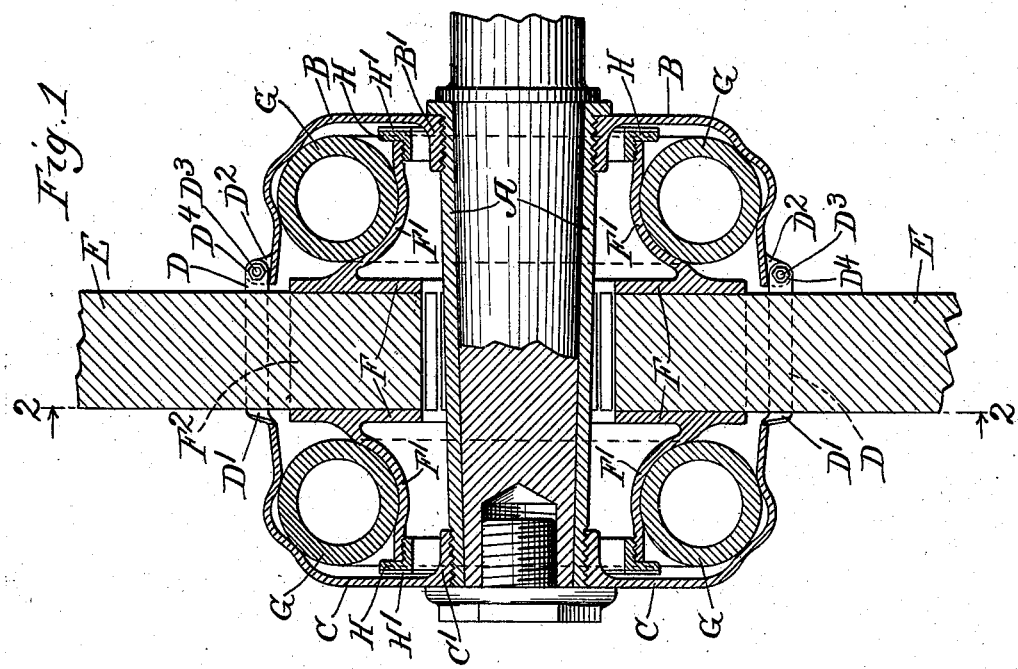
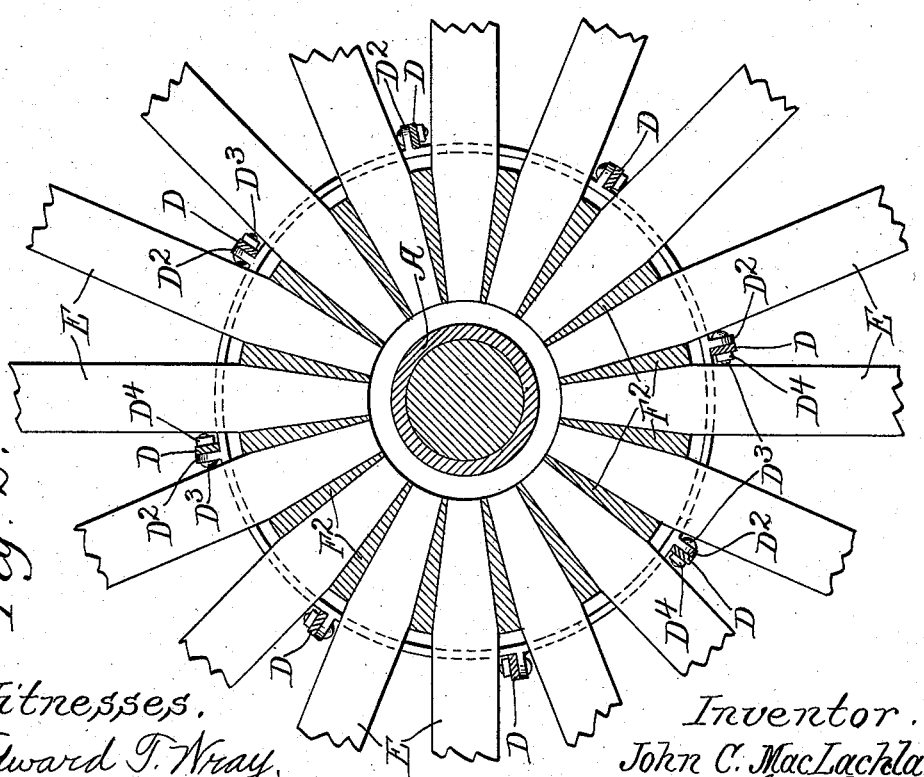
Witnesses.
Edward T. Wray.
Lucy A. Falkenburg.
Inventor.
John C. MacLachlan.
by Parker & Carter
Attorneys.

UNITED STATES PATENT OFFICE.

JOHN C. MacLACHLAN, OF CHICAGO, ILLINOIS, ASSIGNOR OF ONE-HALF TO ALBERT P. HUNT, OF CHICAGO, ILLINOIS.

ELASTIC WHEEL.

No. 858,462.　　　　　Specification of Letters Patent.　　　　　Patented July 2, 1907.

Application filed December 7, 1906. Serial No. 346,710.

*To all whom it may concern:*

Be it known that I, JOHN C. MACLACHLAN, a citizen of the United States, residing at Chicago, in the county of Cook and State of Illinois, have invented a certain new and useful Improvement in Elastic Wheels, of which the following is a specification.

My invention relates to elastic or cushioned wheels, and has for its object to provide in particular new and improved devices in cushioning arrangements for the hubs of wheels.

The invention is illustrated in the accompanying drawings, wherein

Figure 1 is a longitudinal section through a hub constructed according to my invention, and Fig. 2, a cross section on line 2—2 of Fig. 1.

Like letters of reference indicate like parts in all the drawings.

A is the axle box at the inner end of which is the ring B, preferably of somewhat thin elastic metal, with a screw threaded flange $B^1$. On the outer end of the axle box is a second ring C with a similar screw threaded flange $C^1$. These rings B, C are preferably connected together in such a way as to give lateral strength to the hub structure. For example, I have shown a number of straps D extending from one ring to the other between certain of the spokes E. These straps may be separate pieces of metal or integral with one or the other of the rings. I have shown them as consisting of integral strips of metal projecting from the ring C, the strips being given a quarter twist, as shown at $D^1$. The ring B is formed with a number of lugs $D^2$ to which the ends of the strips D may be fastened by means of the bolts $D^3$ and nuts $D^4$. The rings B, C and the straps D form as it were, an outer hollow casing or hub which, of course, turns with the axle box upon the axle. Within this outer hub is an inner or floating hub which is suitably cushioned and guided and in which the spokes are mounted. This floating hub preferably consists of an integral structure composed of the two rings F, F having the upstanding curved flanges $F^1$ $F^1$ and joined together by cross partitions $F^2$ which divide the space between the rings into pockets to receive the ends of the spokes. These spokes may be of any desired construction. For example, they may be ordinary wooden spokes. Between the flanges F and the rings B, C I place some sort of resilient cushioning devices. Preferably, though not necessarily, these devices are pneumatic cushions and I have shown in the drawings a pair of ordinary pneumatic tubes, designated by the letters G, G. I prefer to use cushioning devices of this character because it is well known that the elasticity of the air is very great. For greater resiliency the rings B, C are made somewhat undulating in their contour. The flanges $F^1$ $F^1$ may be encircled by guiding rings H, H carrying buffers $H^1$, $H^1$ of leather or other soft material.

I wish it to be understood that I do not desire to limit myself to the particular devices and arrangements shown and described for obvious modifications will occur to any person skilled in the art.

The use and operation of my device will perhaps have been made clear by the foregoing.

The device may be said to consist broadly of a fixed hub, fixed, that is, in its relation to the axle box, a floating hub, and cushioning devices preferably consisting of pneumatic tubes interposed between the inner and outer hubs. It will be observed that the hub structure is very light and at the same time a structure capable of sustaining a great deal of the lateral strain to which a vehicle wheel hub is necessarily subjected, the two rings B and C being trussed together by the connecting straps. The connection of the inner to the outer hub is entirely through the cushions G, G so that there are no connecting parts or joints to get out of order. A wheel may be provided with any sort of a tire, for example, a thin solid rubber tire may be economically used since it is evident that the wear on a tire of this sort will be greatly reduced because of the resilient structure of the hub.

I claim:

1. In a wheel, the combination of a hub in which the axle is received, with cup shaped rings rigid on the end of said hub and opening toward each other, a floating hub having laterally projecting flanges, spoke pockets, and yielding devices between the rings and flanges, said rings connected at their outer edges, between the spokes.

2. In a wheel, the combination of a hub in which the axle is received, with cup shaped rings rigid on the end of said hub and opening toward each other, a floating hub having laterally projecting flanges, spoke pockets, and yielding devices between the rings and flanges, each of said flanges provided at its outer edge, within its associated cup shaped ring, with a strengthening ring.

3. In a wheel, the combination of a hollow hub fixed in its relation to the axle box, with a floating hub comprising a pair of rings spaced apart with cross partitions between the same dividing the space into a series of compartments for the butts of the spokes, flanges on said rings, pneumatic cushioning devices interposed between the flanges and the fixed hub, and guiding and cushioning devices on said floating hub.

4. In a wheel, the combination of an axle box with inner and outer rings secured thereto, an inner hub structure comprising a series of pockets, spokes in said pockets, flanges on said floating hub, pneumatic cushioning devices interposed between the flanges and the rings, and connecting devices extending between the spokes and connecting the rings.

JOHN C. MACLACHLAN.

Witnesses:
　PERCIVAL H. TRUMAN,
　LUCY A. FALKENBERG.